(12) United States Patent
Jonsson

(10) Patent No.: US 9,345,106 B2
(45) Date of Patent: May 17, 2016

(54) GESTURE BASED LIGHTING CONTROL

(71) Applicant: Greenwave Systems, PTE. LTD., Singapore (SG)

(72) Inventor: Karl S. Jonsson, Rancho Santa Margarita, CA (US)

(73) Assignee: Greenwave Systems PTE. LTD., Singapore (SG)

( * ) Notice: Subject to any disclaimer, the term of this patent is extended or adjusted under 35 U.S.C. 154(b) by 51 days.

(21) Appl. No.: 14/256,172

(22) Filed: Apr. 18, 2014

(65) Prior Publication Data

US 2014/0225526 A1    Aug. 14, 2014

Related U.S. Application Data

(63) Continuation of application No. PCT/US2012/057091, filed on Sep. 25, 2012.

(60) Provisional application No. 61/566,852, filed on Dec. 5, 2011.

(51) Int. Cl.
*H05B 33/08* (2006.01)
*G08B 13/00* (2006.01)
*H05B 37/02* (2006.01)
*G06F 3/0346* (2013.01)

(52) U.S. Cl.
CPC .............. *H05B 37/02* (2013.01); *G06F 3/0346* (2013.01); *H05B 33/0863* (2013.01); *H05B 37/0272* (2013.01)

(58) Field of Classification Search
CPC ....... G06F 3/0346; G06F 3/017; H05B 37/02; H05B 37/0245; H05B 37/0272; H05B 33/08; H05B 33/0842; H05B 33/0845; H05B 33/0863
USPC ................ 315/291, 307, 308, 312, 361, 363; 340/540, 541, 425.5
See application file for complete search history.

(56) References Cited

U.S. PATENT DOCUMENTS

| 7,301,526 | B2 | 11/2007 | Marvit et al. | |
|---|---|---|---|---|
| 8,053,993 | B2* | 11/2011 | Brockmann | H05B 37/029 315/149 |
| 2007/0061020 | A1 | 3/2007 | Bovee et al. | |
| 2008/0203928 | A1 | 8/2008 | Frumau et al. | |
| 2009/0241052 | A1* | 9/2009 | Ha | G06F 3/017 715/772 |

(Continued)

FOREIGN PATENT DOCUMENTS

| WO | 03077100 A | 9/2003 |
|---|---|---|
| WO | 2006038135 A | 4/2006 |

(Continued)

OTHER PUBLICATIONS

Synthe FX Luminair home page (Wayback Machine Capture), Feb. 27, 2010, retrieved from http://web.archive.org/web/20100227084434/http://synthe-fx.com/products/luminair? on May 6, 2014.

(Continued)

*Primary Examiner* — Jimmy Vu
(74) *Attorney, Agent, or Firm* — Bruce A. Young

(57) ABSTRACT

Various gestures, or aspects of the situation, such as location, attitude and/or movement, of a handheld controller are used to control various parameters of lighting, such as brightness or color.

20 Claims, 7 Drawing Sheets

(56) References Cited

U.S. PATENT DOCUMENTS

| | | |
|---|---|---|
| 2011/0199004 A1 | 8/2011 | Henig et al. |
| 2012/0183156 A1 | 7/2012 | Schlessinger et al. |
| 2013/0271004 A1* | 10/2013 | Min et al. .................. 315/112 |

FOREIGN PATENT DOCUMENTS

| | | |
|---|---|---|
| WO | 2006120596 A2 | 11/2006 |
| WO | 2011057287 A1 | 5/2011 |

OTHER PUBLICATIONS

Synthe FX, "Luminair for iPad—OSC controlling DMX" YouTube Video, Nov. 17, 2010, Still Captures from streaming video at https://www.youtube.com/watch?v=-7kPZboNDHg, Captured on Aug. 19, 2015.

Synthe FX, Luminair for iPad User Manual v2, 2012, retrieved from http://www.prestigeledlighting.com/assets/brochures/Ipad_controller.pdf on Aug. 19, 2015.

\* cited by examiner

GESTURE BASED LIGHTING CONTROL

CROSS-REFERENCE TO RELATED APPLICATIONS

The present application is a continuation of international patent application PCT/US2012/057091 which was filed on Sep. 25, 2012 and which claims priority from U.S. Provisional Application No. 61/566,852 filed on Dec. 5, 2011. The entire contents of both aforementioned applications are hereby incorporated by reference for any and all purposes.

BACKGROUND

1. Technical Field

The present subject matter relates to controlling lighting. In particular, it relates to using a handheld controller to control lighting.

2. Description of Related Art

Modern lighting systems, especially those lighting systems using light emitting diodes (LEDs), may be controlled in various ways. Many lighting systems include provisions to allow for varying the brightness of the lighting systems. In some lighting systems, the brightness may be controlled by changing the waveform of the alternating current (AC) electrical connection provided to the lighting by using a dimmer in series with the lighting on the AC circuit. Some more modern systems provide for an alternative method of controlling brightness by communicating with the luminaires of the lighting system to allow circuitry within the luminaire to control the brightness. Some lighting systems also allow the color of the lighting system to be controlled by communicating with circuitry in the luminaire.

Some lighting systems include a remote control for changing the brightness and/or color of the lighting. These remote controls provide buttons for a user to press in order to control the lighting and use standard infrared communication techniques to communicate with the luminaires or with a base station that then communicates with the luminaires or controls the luminaires directly.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 1A:
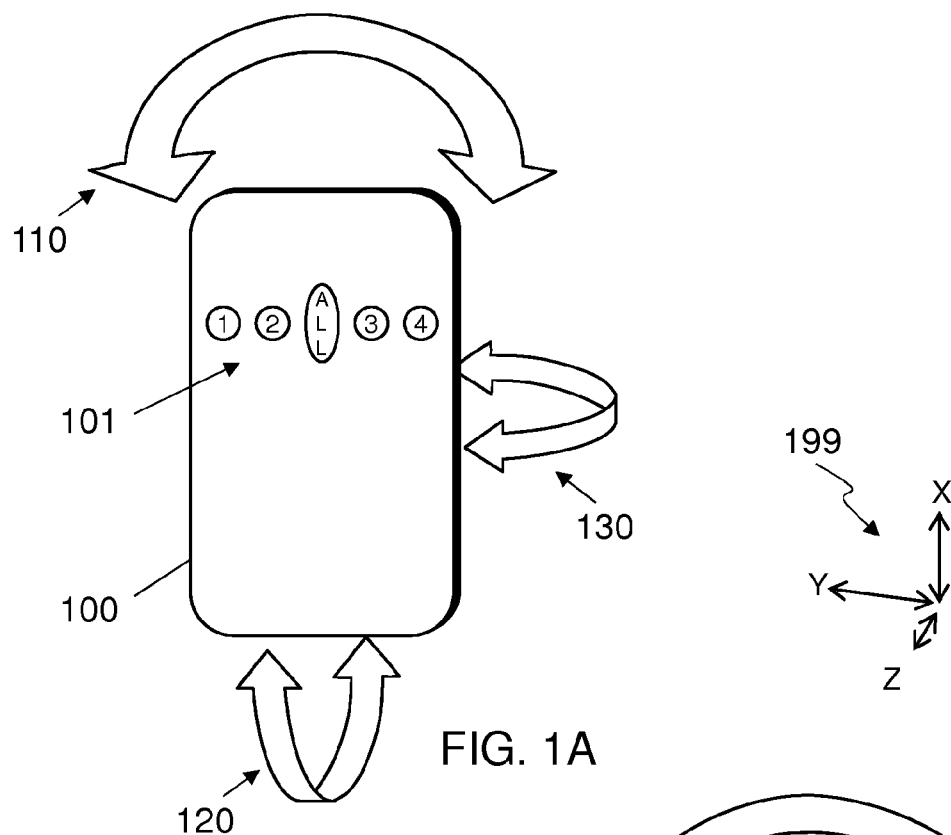
FIG. 1A shows a handheld controller for lighting.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

The word "situation," as used herein, may refer to a position and/or movement in three-dimensional space (3-space). It may be used to refer to one or more of the six degrees of freedom of movement by a device in 3-space. Those six degrees of freedom are commonly referred to as X, Y, Z, yaw, pitch and roll with the X, Y & Z collectively referred to as a location and yaw, pitch and roll collectively referred to as attitude. In some embodiments, other types of coordinates may be used to describe a situation, such as using polar coordinates (e.g. latitude, longitude, and elevation) to describe a location.

Position may refer to location, attitude, or both location and attitude. In some embodiments, the situation may be measured relative to an initial situation of the handheld controller, but other embodiments may detect an absolute situation of the handheld controller in 3-space or relative to a fixed reference. In many embodiments, the reference z-axis may be aligned with gravity so that gravity accelerates in the negative z direction. In some embodiments, the reference x-axis may be aligned with an initial position of the long axis of the handheld controller projected onto a level plane, with the reference y-axis perpendicular to the reference x-axis and z-axis. In other embodiments, the reference x-axis and y axis may correspond to particular compass headings, such as north and west, respectively. Roll describes rotation about the x-axis, pitch describes rotation about the y-axis, and yaw describes rotation about the z-axis.

In addition to the positional parameters described above, situation may also include a velocity and/or acceleration vector related to one or more of the six degrees of freedom. Examples of movement related parameters may include a three-dimensional (3D) linear velocity vector such as (1,5,–1) feet per second (fps) which is movement to the left and slightly forward and downward, a single parameter acceleration such as a 32 feet per second$^2$ (fps$^2$) gravitational acceleration toward the floor if the handheld controller is dropped, or an angular velocity vector such as (360, 90, –540) degrees per second.

Reference now is made in detail to the examples illustrated in the accompanying drawings and discussed below.

FIG. 1A shows a handheld controller 100 for lighting. The handheld controller may have one or more buttons 101 such as the four buttons corresponding to four different portions of lighting to control and a fifth button to control the entire lighting system. A coordinate system 199 may show the how the handheld controller 100 (and smartphone 105 of FIG. 1B) may be oriented with the long axis of the handheld controller 100 aligned with the x-axis if it is held level (i.e. perpendicular to the gravity vector). The handheld controller 110 may be rotated around the z-axis which may be referred to as yaw 110. The handheld controller 110 may be rotated around the y-axis which may be referred to as pitch 120. And the handheld controller 110 may be rotated around the x-axis which may be referred to as roll 130. The handheld controller may have situation detection circuitry capable of detecting the yaw 110, pitch 120 and/or roll 130.

The handheld controller 100 may be battery operated or otherwise self-powered so that no power cords are attached to the handheld controller 100 while it is in use, although some embodiments may provide a connector for a power connector to allow batteries in the handheld controller 100 to be charged. The handheld controller 100 may include a wireless network interface so that no communication wires are connected while in use. The lack of power and communication wiring allows the situation of the handheld controller 100 to be easily manipulated. The handheld controller 100 may be sized to easily fit in a user's hand. In some embodiments, the handheld controller 100 may have an x-dimension between 2 and 7 inches, a y-dimension between 0.5 and 4 inches, and a z-dimension between 0.1 and 1 inch, although other embodiments may have dimensions larger or smaller than those provided. In one embodiment, the handheld controller 100 may be about 4×2×0.25 inches. Some embodiments, such as an embodiment using a tablet running software to act as the handheld controller, may be significantly larger, but still may be easily handled and transported by a consumer using one or both hands.

Figure 1B:
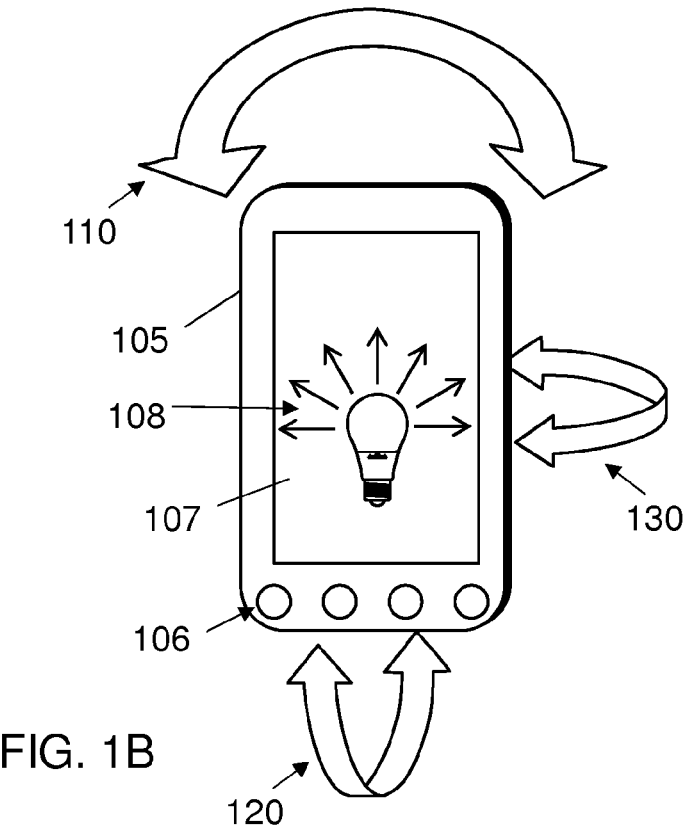
FIG. 1B shows a smartphone running a computer program to act as a handheld controller for lighting.

FIG. 1B shows a smartphone 105 running a computer program to act as a handheld controller for lighting. The smartphone 105 may include one or more buttons 106 as well as a display with touchscreen 107. The smartphone 105 may be an iPhone®, a phone using the Android™ operating system, a Blackberry®, or some other type of phone capable of running an applications such as one for controlling lighting as described herein. A smartphone 105 may include situation detection circuitry and may be loaded with software allowing it to detect yaw 110, pitch 120, and/or roll 130, of the smartphone 105. The smartphone 105 may include a software program that allows the smartphone 105 to act as a controller for lighting as described herein. The software may include an interactive display 108 allowing for ease of use by a consumer. Other embodiments may use a tablet running software to act as a handheld controller for lighting.

Figure 2A:
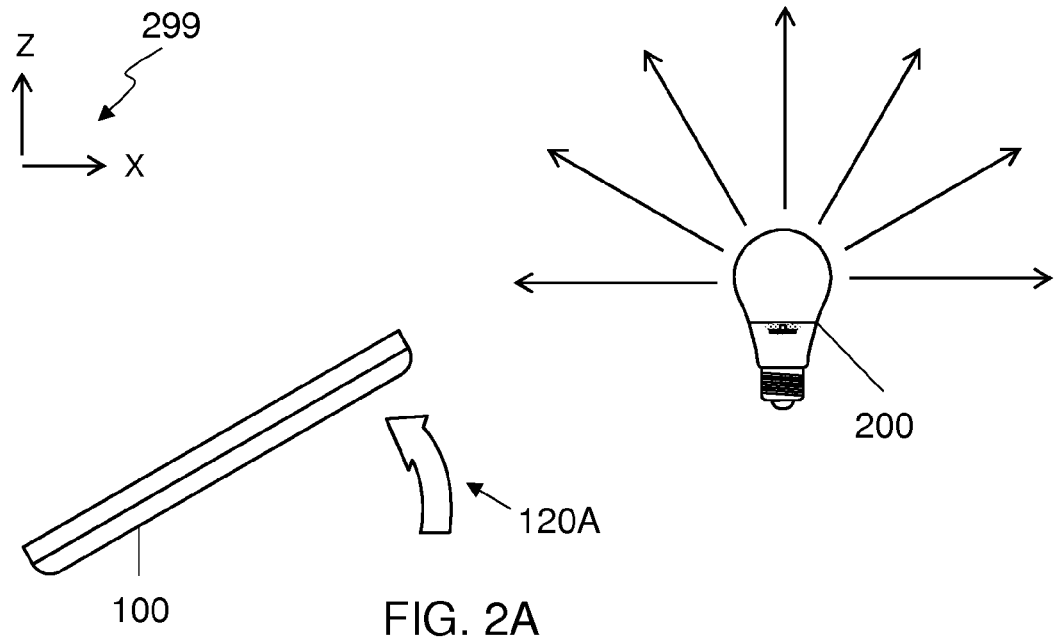
FIGS. 2A, 2B and 2C show a handheld controller changing the brightness of lighting.
Figure 2B:
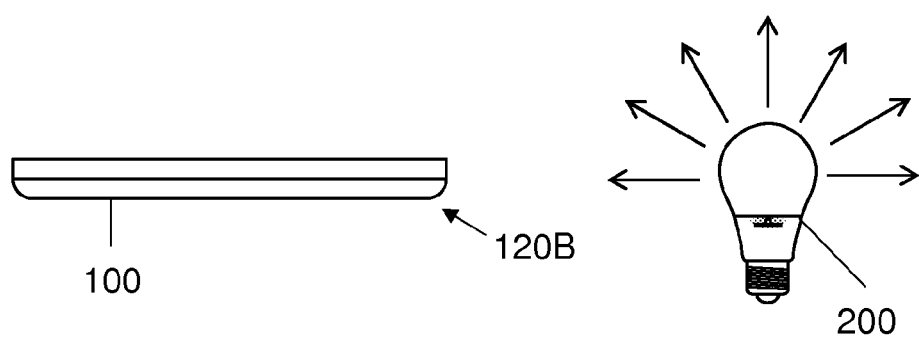
Figure 2C:
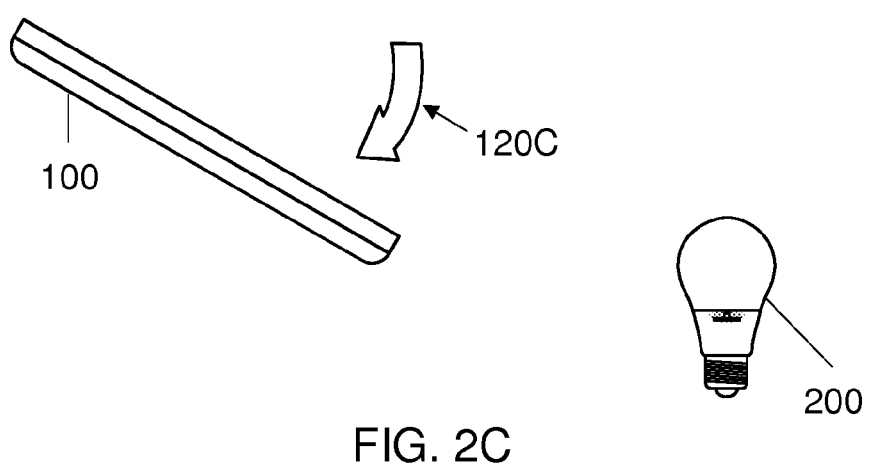

FIGS. 2A, 2B and 2C show a handheld controller 100 changing the brightness of lighting 200. The three views are positioned as shown by the coordinates 299 with the z-axis up, the x-axis to the right and the y-axis straight into the page. The right side of the handheld controller 100 is shown in each of the three views.

In FIG. 2A, the handheld controller 100 is situated to have a positive pitch 120A, with the front of the handheld controller 100 higher than the rear of the handheld controller 100. In this situation, the positive pitch 120A may set the brightness of the light 200 to a bright state. In some embodiments, any pitch greater than 45 degrees may set the light 200 to a full brightness level, although various embodiments may use a smaller or greater pitch for full brightness.

In FIG. 2B, the handheld controller 100 is situated so have a neutral pitch 120B, with the front of the handheld controller 100 at the same height than the rear of the handheld controller 100. In this situation, the zero degree pitch 120B may set the brightness of the light 200 to a 50% brightness state.

In FIG. 2C, the handheld controller 100 is situated to have a negative pitch 120C, with the rear of the handheld controller 100 higher than the front of the handheld controller 100. In this situation, the negative pitch 120C may set the brightness of the light 200 to an off state. In some embodiments, any pitch less than −45 degrees may set the light 200 to off, although various embodiments may use a smaller or greater pitch for the off state.

In the embodiment shown, the brightness of the light 200 may be set to an interpolated value using linear or non-linear interpolation between off and 100% based on the pitch 120 of the handheld controller 100 ranging from −45 degrees to +45 degrees. For example, if the pitch 120 of the handheld controller 100 is at −15 degrees, the brightness of the light 200 may be set to 33%, since −15 degrees is one third of the way from −45 degrees to +45 degrees. Various embodiments may use different ranges of pitch 120 to control the brightness, such as an embodiment that may vary the brightness from off at level to full on at −60 degrees of pitch 120. In other embodiments, any positive pitch 120A over a threshold may gradually increase the brightness of the light 100 and any negative pitch 120C below a threshold may gradually decrease the brightness of the light 100. The amount of positive or negative pitch 120 may increase the speed of the change or may be ignored, depending on the embodiment. In other embodiments, the pitch 120 of the handheld controller may be used to change a different parameter of the light 200 and in some embodiments, the brightness of the light 200 may be controlled with a different aspect of the situation of the handheld controller 100, including, but not limited to, yaw 110 or roll 130.

Figure 3A:
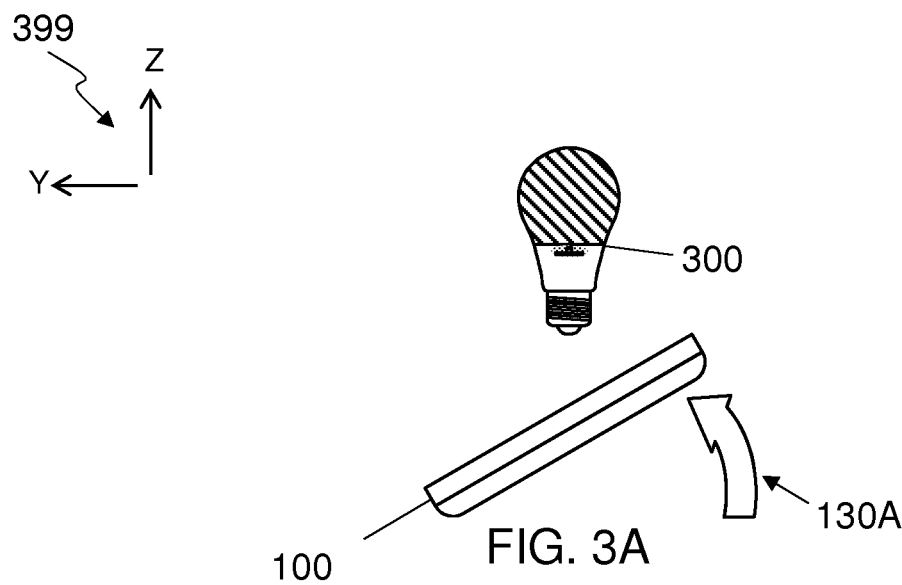
FIGS. 3A, 3B and 3C show a handheld controller changing the color of lighting.
Figure 3B:
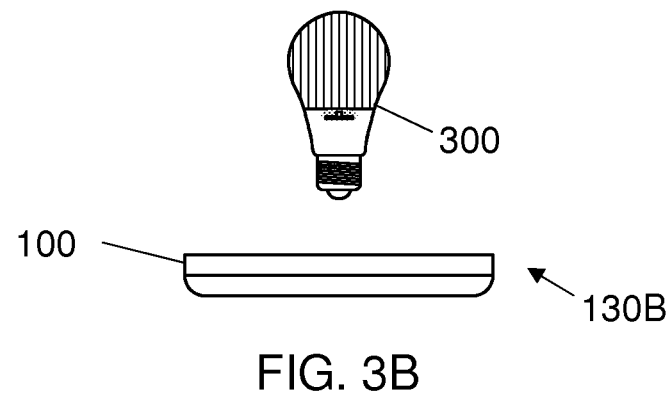
Figure 3C:
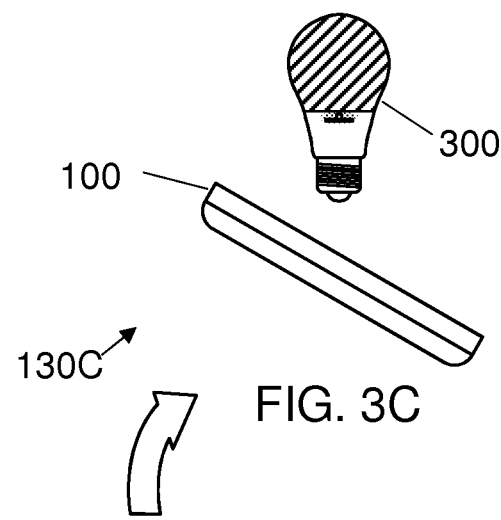

FIGS. 3A, 3B and 3C show a handheld controller 100 changing the color of lighting 300. The three views are positioned as shown by the coordinates 399 with the z-axis up, the y-axis to the left and the x-axis straight into the page. The rear of the handheld controller 100 is shown in each of the three views. Although some embodiments may change the color between completely different hues, such as red, green and blue, other embodiments may change the color by changing the color temperature of a "white light" coming from the light 300.

In FIG. 3A, the handheld controller 100 is situated to have a counter-clockwise roll, so that the right side of the handheld controller 100 higher than the left side of the handheld controller 100. This may be indicated by a negative roll 130A. In this situation, the negative roll 130A may set the color temperature of the light 300 to a warmer color which may be represented by a cooler black body radiation temperature. In some embodiments, any roll 130 less than a −30 degree threshold (e.g. −45 degree roll) may gradually decrease the black body radiation temperature of the light 300 until a minimum color temperature, such as 1700K, is reached, although various embodiments may use a smaller or greater roll threshold and/or minimum color temperature.

In FIG. 3B, the handheld controller 100 is situated to have a neutral roll, with the right side of the handheld controller 100 at the same height than the left side of the handheld controller 100. This may be indicated by a zero degree roll 130B. In this situation, the zero degree roll 130B may leave the color temperature of the light 300 unchanged.

In FIG. 3C, the handheld controller 100 is situated to have a clockwise roll, with the left side of the handheld controller 100 higher than the right side of the handheld controller 100. This may be indicated by a positive roll 130C. In this situation, the positive roll 130C may set the color temperature of the light 300 to a cooler color which may be represented by a warmer black body radiation temperature. In some embodiments, any roll 130 greater than a 30 degree threshold may gradually increase the black body radiation temperature of the light 300 until a maximum color temperature, such as 10,000K, is reached, although various embodiments may use a smaller or greater roll threshold and/or maximum color temperature.

In the embodiment shown, the color temperature of the light 300 may be gradually changed based on the roll 130 of the handheld controller. In some embodiments, the amount of roll 130 does not matter once the threshold is exceeded. In other embodiments, the amount of roll 130 above or below the threshold may affect the speed of the change of the color temperature. Other embodiments may use an absolute value of the roll 130 to determine a color temperature so that a −45 degree roll 130 or less may represent 1700K, a 45 degree roll 130 or more may represent 10,000K, and linear or non-linear interpolation of the roll 130 used to determine a color temperature for roll 130 between 45 degrees and −45 degrees. In other embodiments, the roll 130 of the handheld controller may be used to change a different parameter of the light 300 and in some embodiments the color of the light 200 may be controlled with a different aspect of the situation of the handheld controller 100 including, but not limited to yaw 110 or pitch 120.

Figure 4A:
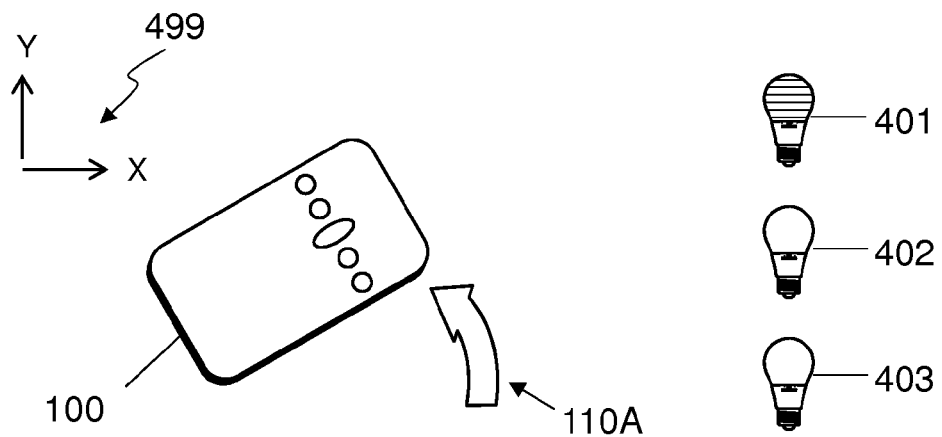
FIGS. 4A, 4B and 4C show a handheld controller changing the portion of lighting to control.
Figure 4B:
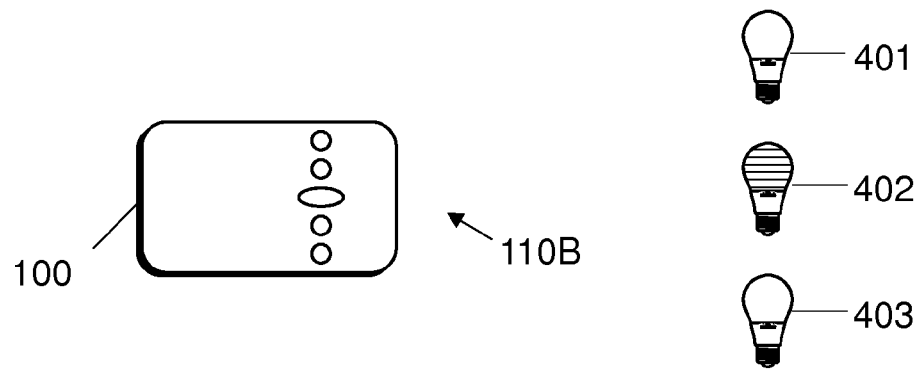
Figure 4C:
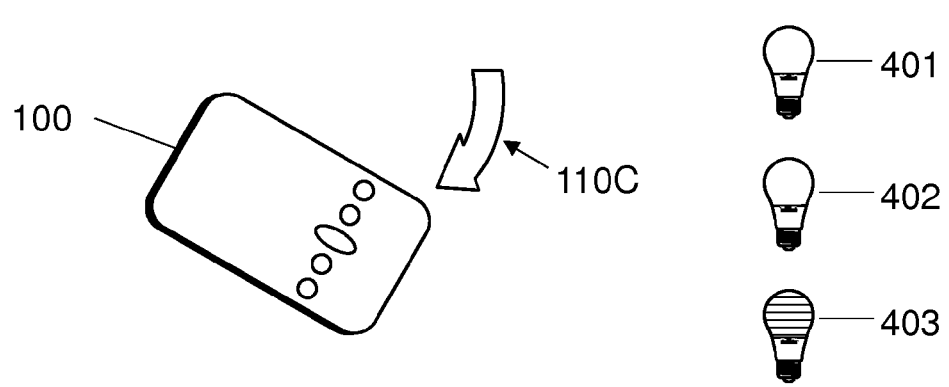

FIGS. 4A, 4B and 4C show a handheld controller 100 changing the portion of lighting 401-403 to control. The three views are positioned as shown by the coordinates 499 with the y-axis up, the x-axis to the right and the z-axis straight out of the page. The top of the handheld controller 100 is shown in each of the three views.

In FIG. 4A, the handheld controller 100 is situated to have a leftward yaw, with the front of the handheld controller 100 farther to the left than the rear of the handheld controller 100. This may be indicated by a negative yaw 110A. In this situation, the negative yaw 110A may select the leftmost luminaire 401 for control.

In FIG. 4B, the handheld controller 100 is situated to have a neutral yaw, with the front of the handheld controller 100 in line with the rear of the handheld controller 100. This may be indicated by a zero degree yaw 110B. In this situation, the zero degree yaw 110B may select the middle luminaire 402 for control.

In FIG. 4C, the handheld controller 100 is situated to have a rightward yaw, with the front of the handheld controller 100 farther to the right than the rear of the handheld controller 100. This may be indicated by a positive yaw 110C. In this situation, the positive yaw 110C may select the rightmost luminaire 403 for control.

In the embodiment shown, the lighting includes three luminaires. In some embodiments with different numbers of luminaires, a particular range of yaw 110 may select a particular luminaire for control. Some embodiments may include a particular yaw 110 for controlling the entire lighting system. In other embodiments, the luminaires may be logically organized as a ring and any positive yaw 110 above a threshold gradually moves selection around the ring to the right, while any negative yaw 110 below a threshold gradually moves selection around the ring to the left. The amount of yaw 110 may not matter once the threshold is exceeded in some embodiments, but other embodiments may change the speed of the changing selection based on the value of the yaw 110. In other embodiments, the yaw 110 of the handheld controller may be used to change a different parameter of the luminaires 401-403, and in some embodiments, luminaire 401-403 selection may be controlled with a different aspect of the situation of the handheld controller 100 including, but not limited to, pitch 120 or roll 130. Some embodiments may change the portion of the lighting to control in response to a gesture of the handheld controller.

Figure 5:
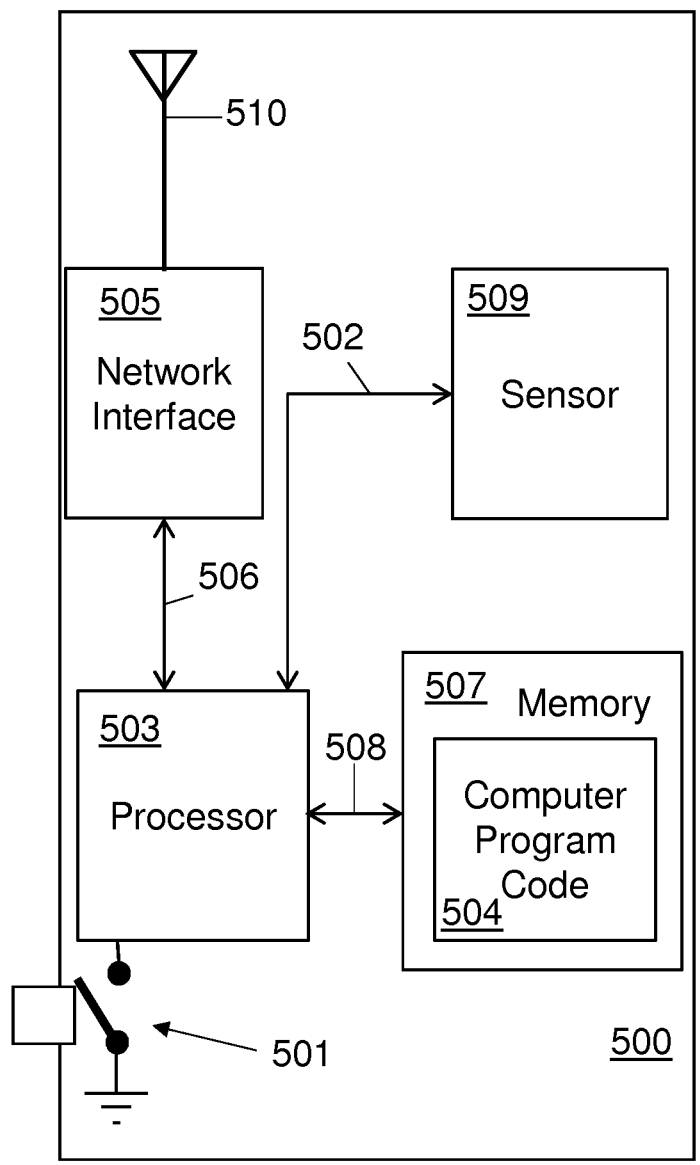
FIG. 5 is a block diagram of a handheld controller for lighting.

FIG. 5 is a block diagram of a handheld controller 500 for lighting. The handheld controller 500 may be based on a microprocessor, microcontroller, central processing unit (CPU) or other processing circuitry shown as processor 503. Other embodiments may utilize customized circuitry such as might be implemented in a field programmable gate array (FPGA) or other custom designed circuitry. The handheld controller may include one or more buttons 501 for use by a user. The button 501 may be a mechanical switch, a hall effect switch, a capacitive proximity sensor, a touchscreen, or any other type of touch/proximity sensitive input device. The processor 503 may be able to detect if the button 501 is pressed. Other embodiments may include a touchscreen in place of, or in addition to, the button 501.

The handheld controller 500 may include a network interface 505 in coupled to the processor 503 using interconnect 506 which may be a point-to-point interface, a bussed interface, or any other type of proprietary or standardized interface. In some embodiments the processor 503 and network interface 505 may be integrated into a single integrated circuit. The network interface 505 may connect to an antenna 510 for communicating over a wireless network, such as Zigbee or Z-Wave and may be compliant with IEEE 802.15.4. Some embodiments may use a WiFi network compatible with a version of IEEE 802.11. Some embodiments may use a telephony data network such as global systems for mobile communications (GSM), enhanced data rates for GSM evolution (EDGE), universal mobile telecommunications system (UMTS), code division multiple access 2000 (CDMA2000), long term evolution (LTE), or other wireless telephony data standard. The handheld controller 500 may include one or more semiconductor memory devices 507, such as dynamic random access memories (DRAM), synchronous dynamic random access memories (SDRAM), double data rate memories (DDR), flash memories, read only memories (ROM), electrically erasable programmable read only memories (EEPROM) or other memory devices, that are coupled to the processor 503 using interconnect 508 which may be a standard memory interface or some other type of electrical interconnect. In some embodiments, the processor 503 and memory 507 may be integrated on a single integrated circuit. In at least one embodiment, the processor 503, memory 507 and network adapter 505 may be integrated on a single integrated circuit such as the CC2530 from Texas Instruments (TI) which includes a Zigbee network interface.

The handheld controller 500 may include a sensor 509, or situation detection circuitry, for determining a situation of the handheld controller. The sensor 509 may include one or more accelerometers or magnetometers in some embodiments. In at least one embodiment, the sensor 509 may include a three-axis accelerometer, such as the Freescale® MMA8453Q, and a three-axis magnetometer, such as the Freescale MAG3110. The processor 503 may communicate with the sensor 509 using communication link 502, which may be an $I^2C$ interface, a bussed interface or any other type of parallel or serial interface. The processor 503 may be able to retrieve data from the sensor 509 that may be used to determine the situation of the handheld controller, such as its attitude in space, movement, linear or angular distance moved, compass heading, or other parameters related to its position or movement in space. In some embodiments, the signal strength of the wireless network and/or ping time of the wireless network may be used to help determine a position of the handheld controller 500. Other embodiments may include other types of circuitry in the sensor 509, such as, but not limited to, global positioning system (GPS) chips, near-field radio frequency identifier (RFID) readers, light sensors, cameras, microphones, or other types of sensors.

While some embodiments of the handheld controller 500 may be based on dedicated hardware, other embodiments may utilize handheld devices that have other uses beyond that of a lighting controller. Examples of such devices include smartphones or tablets. Smartphones that may be suitable for use as a handheld controller 500 include an Apple iPhone®, a phone using Google's Android operating system or a Blackberry® from Research in Motion. Tablets that may be suitable for use as a handheld controller 500 include an Apple iPad®, a Samsung Galaxy Tab™, and a Motorola Xoom™. Many smartphones and tablets include the processor 503, the network interface 505, the sensor 509, and the memory 507. Some smartphones and tablets may include the button 501 while others may include a touchscreen display that may act as a button if programmed to do so. A smartphone or tablet may act as a handheld controller 500 for lighting as described herein if appropriate software, as described below, is installed.

The handheld controller 500 may include computer program code 504 stored in the memory 507 that can be read and executed by the processor 503 to provide elements of various embodiments. A wide variety of functions may be performed by the computer program code 504, including code implementing various methods of controlling lighting based on the situation of the handheld controller 500. In some embodiments, the computer program code 504 may implement the methods described in the flowcharts of FIGS. 7A and 7B described later in this specification. Various embodiments may include code for various functions, including code implementing one or more of the functions listed below:

- determine a change to the lighting based on the situation of the handheld controller
- send a message to initiate the change to the lighting
- detect that a button of the handheld controller is being pressed
- set a parameter of the lighting based on the button press and the situation of the handheld controller
- adjust a parameter of the lighting based on the situation of the handheld controller until the button is released
- detect that a touchscreen on the handheld controller is being touched
- set a parameter of the lighting based on the touch and the situation of the handheld controller
- detect a gesture, such as a shake, a particular movement, or a period of stability, of the handheld controller
- send the message in response to the gesture
- adjust a parameter of the lighting based on the situation of the handheld controller after the first gesture is detected
- halt the adjustment of the parameter in response to the second gesture
- retrieve readings from at least one accelerometer in the handheld controller to detect the situation of the handheld controller
- retrieve readings from at least one magnetometer in the handheld controller to detect the situation of the handheld controller
- retrieve readings from a three-axis magnetometer and a three-axis accelerometer in the handheld controller to detect the situation of the handheld controller
- calculate yaw, pitch or roll of the handheld controller based on readings from one or more accelerometers and/or one or more magnetometers
- determine a brightness of the lighting based on yaw, pitch, or roll of the handheld controller
- determine a color of the lighting based on a yaw, pitch, or roll of the handheld controller
- determine a portion of the lighting to control based on a yaw, pitch, or roll of the handheld controller
- determine a portion of the lighting to control based on a proximity of the handheld controller to the portion of the lighting
- determine a portion of the lighting to control based on a gesture of the handheld controller
- send a message over a computer network using radio frequency communication The computer program code 504 may utilize code implementing one or more of the functions listed above to control lighting. For example, in one embodiment, the computer program code 504 may detect a situation of a handheld controller, such as the yaw, pitch or roll of the controller by retrieving readings from a three-axis magnetometer and a three-axis accelerometer and calculating the yaw, pitch and roll of the handheld controller from those readings. It may then determine a change to the lighting based on the yaw, pitch and roll. It may determine a brightness for the lighting based on the pitch of the handheld controller with values above 45 degrees being full brightness, values below −45 degrees being off, and values between 45 degrees and −45 degrees being interpolated between full brightness and off. The program code 504 may detect a button press and send a message over the wireless network in response to the button press to set the brightness of the lighting to the determined value. Other embodiments may include various functions above and/or other functions to implement any of the techniques or methods described herein.

Figure 6:
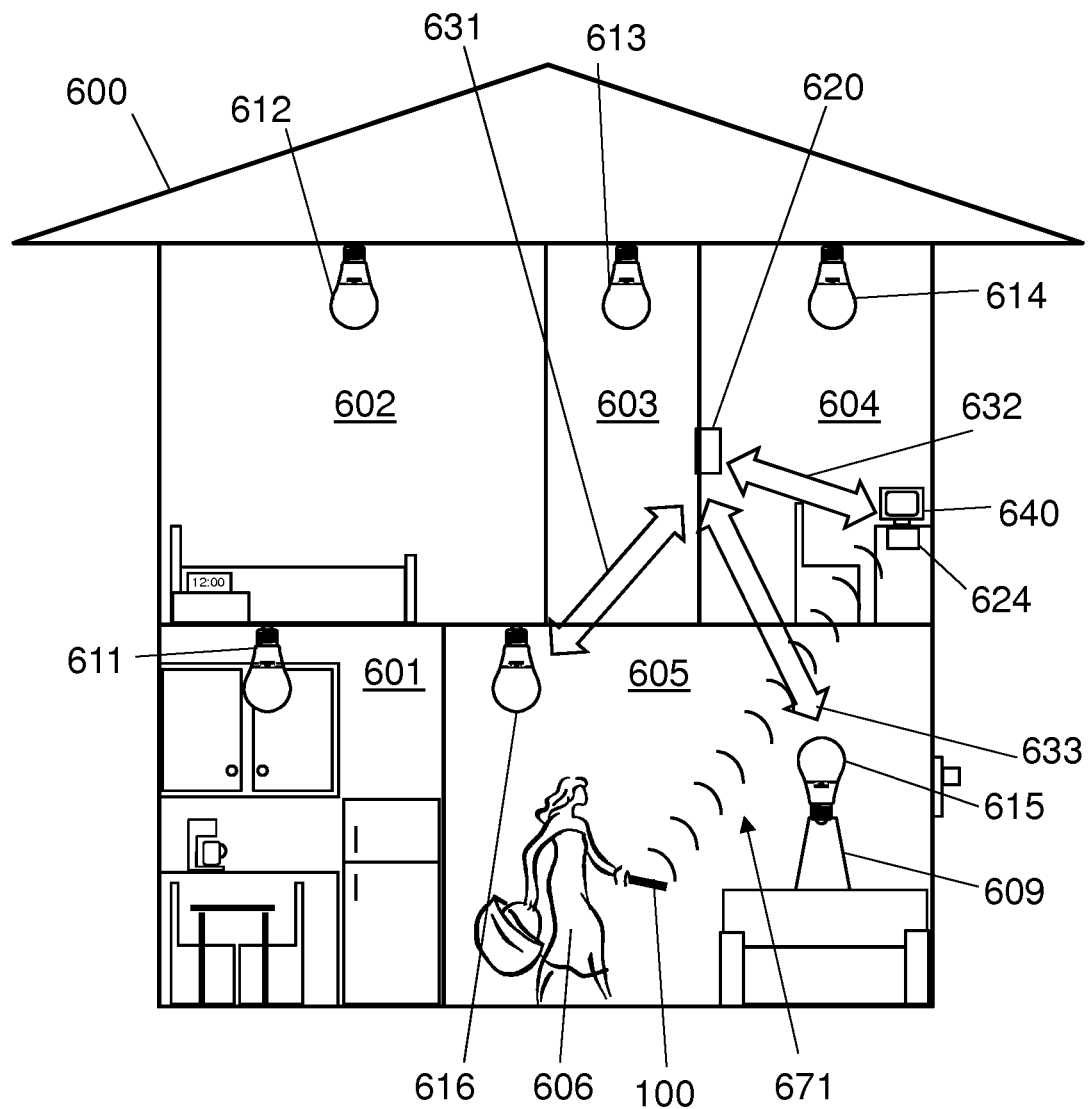
FIG. 6 shows a stylized view of a networked home.

FIG. 6 shows a stylized view of a networked home 600. In the embodiment shown, networked devices communicate over a wireless mesh network such as Z-wave or Zigbee (IEEE 802.15.4). Other wireless networks such as Wi-Fi (IEEE 802.11) might be used in a different embodiment. This exemplary home 600 has five rooms. The kitchen 601 has a networked light fixture 611. The bedroom 602 has a networked light fixture 612, and the hallway 603 has a networked light bulb 613. The home office 604 has a networked light bulb 614, a first network controller 620, and a computer 640 connected to a second network controller 624. The living room 605 has two networked light bulbs 615, 616. Networked light bulb 615 may be in a lamp 609. Homeowner 606 decides to control the lights in the living room 605 using handheld controller 100.

The homeowner 606 may press a button on the handheld controller 100 to indicate that she is going to adjust a parameter of the lights in the living room 605. In some embodiments, a specific button on the handheld controller may be associated with the lights of the living room 605, bulbs 615, 616. In other embodiments, it may be detected that the handheld controller is in the living room 605, automatically selecting the bulbs 615, 616 for adjustment. In some embodiments, the homeowner 606 may then begin to change the situation of the handheld controller 100 while holding the button, with the bulbs 615, 616 interactively responding to changes in the situation of the handheld controller 100 as long as the button is held down. The homeowner 606 may vary the yaw of the handheld controller 100 to select the first bulb 615, the second bulb 616, or both bulbs. Varying the pitch of the handheld controller 100 may change the brightness of the selected bulb(s) and varying the roll of the handheld controller 100 may change the color temperature of the bulb(s). Once the homeowner 606 has the lighting of the living room 605 adjusted to her liking, she may release the button to set the parameters. Other embodiments may utilize differing changes to the lighting in response to the situation of the handheld controller 100 and/or differing methods of initiating and ending the adjustment process.

In some embodiments, the homeowner 606 may move to another room, such as the kitchen 601. In some cases, the change in the situation of the handheld controller 100 to the kitchen 601 may be detected and change the handheld controller to communicate with the bulb 611 in the kitchen 601. In other cases, a different button on the handheld controller 100 may be pressed to indicate a desire to change parameters of the lighting in the kitchen 601.

The handheld controller 100 may communicate with the lighting 611-615 in different ways, depending on the embodiment. In some embodiments, the handheld controller 100 and the various luminaires, or light bulbs 611-616, may communicate with each other using a wireless mesh network such Zigbee or Z-Wave, a wireless infrastructure network such as WiFi, or other wireless network. Such networks may have various ways of configuring the network and enrolling the various luminaires so that the handheld controller 100 may be able to communicate directly with the luminaires 611-616. In other embodiments, such as that shown in FIG. 6, the handheld controller 100 may communicate with a network controller 624. The network controller 624 may then communicate with other devices, such as computer 640 and other network controller 620, to process the messages received from the handheld controller 100 and pass them to the light bulbs 611-616. The network controller 624 may communicate with the light bulbs 611-616 over the same wireless network used to communicate with the handheld controller 100, a different wireless network, wired connections, or any combination of wireless networks, and wired connections. A network controller 620, 624 may be any type of network device and may refer to routers, switches, computers, gateways, Z-wave controllers, Zigbee coordinators, access points, or other types of network equipment. In some embodiments, the handheld controller 100 may communicate with a remote server located away from the home 600 over a telephony data network and the remote server may then communicate with a network controller in the home, or directly with the various luminaires, to pass the control messages to the various luminaires in the home.

In FIG. 6, the handheld controller 100 may communicate with the network controller 624 over wireless network 671. In some embodiments, the handheld controller 100 may send a message indicating that the lighting of the living room 605 should dim or change is some way. In other embodiments the handheld controller may simply send a message reporting its situation to the network controller 624. The network controller 624 may process the message and interpret the message to determine that the lighting of the living room 605 should be dimmed. The network controller 624 may then communicate over a wireless link 632 to another network controller 620 which may pass the message over wireless link 631 to the light bulb 616 and over wireless link 633 to light bulb 615, causing them to dim. In some embodiments the message from the first network controller 624 to the second network controller 620 and on to the light bulbs 615, 616 may be sent using power line communication (PLC).

In some commercial embodiments, a consumer kit for a system may include multiple items to allow for a user to easily create a lighting system controllable with a handheld controller. Such a kit may include one or more of the following: a handheld controller, handheld controller smartphone/tablet software, a network controller, and one or more networked luminaires. During manufacture and testing, these devices may be preconfigured with identification codes allowing interoperation.

Figures 7A, 7B:
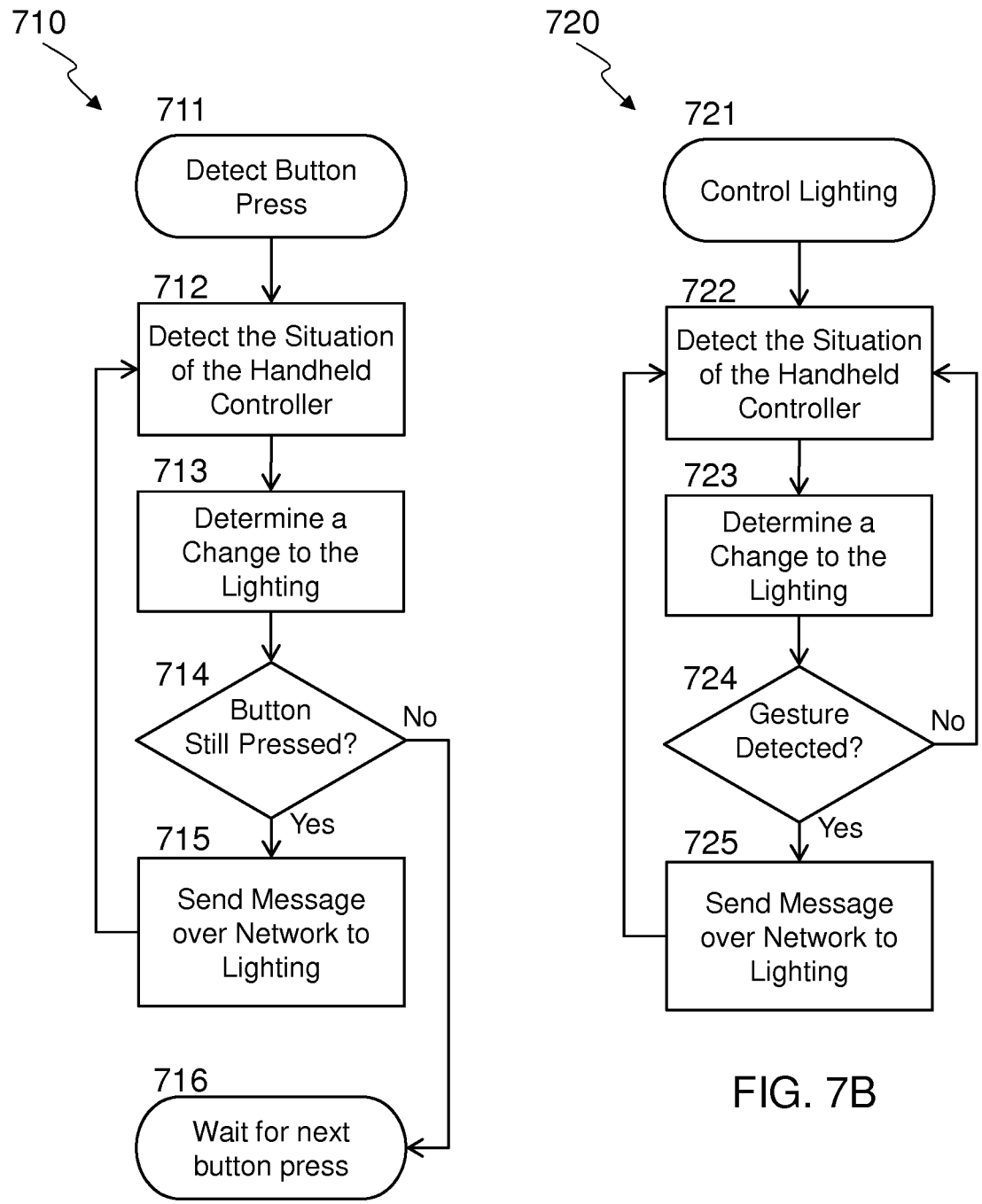
FIGS. 7A and 7B are flowcharts depicting embodiments of methods of controlling lighting with a handheld controller.

FIG. 7A is a flowchart 710 depicting an embodiment of a method of controlling lighting with a handheld controller. A button press on the handheld controller may be detected at block 711 to start controlling the lighting. In some embodiments the particular button pressed may determine which lighting is to be controlled. Other embodiments may use different ways of determining the lighting to be controlled. At block 712, the situation of the handheld controller may be detected. The situation may include information about the location, attitude, velocity and/or acceleration of the handheld controller. In at least one embodiment, a yaw, pitch, and roll of the handheld controller may be detected, although in other embodiments, other aspects of the situation, instead of, or in addition to, the yaw, pitch, and roll may be detected.

In block 713 a change to the lighting may be determined. The change can involve any parameter of the lighting including, but not limited to, brightness, color, color temperature, direction of lighting, a portion of the lighting to be controlled, a time period before the lighting is turned on or off, or any other parameter of the lighting. The change may be determined using the situation of the handheld controller. In at least one embodiment, the yaw may be used to determine a particular portion of the lighting to control (e.g. a particular bulb), pitch may be used to determine a brightness of the lighting, and the roll may be used to determine a color temperature of the lighting.

A portion of the lighting being controlled may be determined by a change in yaw of the handheld controller from the time that the button was pressed, with various amounts of change corresponding to the various bulbs of the lighting. If the lighting has 4 different bulbs, a change of yaw a different bulb for every 30 degrees of yaw, so that a 90 degree range of yaw may allow any one of the 4 bulbs to be controlled. An indication of which bulb is being controlled may be accomplished by flashing the bulb or by various other mechanisms. The brightness of the lighting may be determined by a pitch greater than 45 degrees being full brightness, a pitch of less than −45 degrees being off, and a pitch between −45 and +45 degrees being interpolated as a brightness between off and full brightness, with level (i.e. 0 degrees pitch) being 50% brightness. The color temperature of the lighting may be determined by the roll of the handheld controller with any clockwise roll over 15 degrees making the color temperature gradually warmer, and any counter-clockwise roll over 15 degrees making the color temperature gradually cooler.

At block 714, the button is checked to see if it is still pressed. If the button is still pressed, a message is sent over the network to the lighting to change to the calculated brightness level. Then the situation of the handheld controller is rechecked at block 712 and a new change to the lighting is detected at block 713. As long as the button is held, the situation of the handheld controller may interactively change the lighting.

Once the user is satisfied with the setting of the lighting, the button may be released. The button release may be detected at block 714 and the handheld controller may stop sending new change messages to the lighting. This may leave the lighting with the last setting that was sent. The handheld controller may wait for the next button press at block 716.

A gesture may be any sequence of situations of the handheld controller. In some embodiments, the movement of the handheld controller to adjust a parameter of the lighting may be one gesture, such as a change in pitch changing the brightness of the lighting as described above. Thus gestures of the handheld controller may be used as the basis of controlling lighting. Some embodiments may substitute a first gesture of the handheld controller for the button press and a second gesture of the handheld controller for the button release of the flowchart 710. These gestures may be a predefined movement or set of movements of the handheld controller. Depending on the embodiment, various gestures may be defined to start or stop the process of adjusting a parameter of the lighting. In one embodiment, a first gesture of a quick shake of the handheld controller may be used in place of the button press and a second gesture of holding the handheld controller steady for a predetermined length of time, such as 3 seconds in one embodiment, may be used to end the adjustment. Other embodiments may use other gestures such as a vertical shake, a horizontal shake, a rapid movement to point the handheld controller to the ceiling or floor, or any other type of change in situation of the handheld controller.

FIG. 7B is a flowchart 720 depicting an alternative embodiment of a method of controlling lighting with a handheld controller. The flowchart starts at block 721 and may detect the situation of the handheld controller at 722, such as determining the pitch of the handheld controller. A change to the lighting may be determined at block 723. The determination may be made similarly to the determination in block 713 of flowchart 710. At block 724 it is determined if a gesture has been detected. If no gesture is detected, the handheld controller continues to detect the situation of the handheld controller at block 722 and determine a change to the lighting at block 723. Once a gesture is detected at block 724, a message is sent from the handheld controller to the lighting to change the lighting. In one embodiment, the gesture may a quick horizontal shake. Note that if the method of flowchart 720 is used, the lighting may not change any of its parameters until the gesture is detected. But in some case where a display is present on the handheld controller, such as if the handheld controller is a smartphone or tablet, an interactive display may inform the user of the currently determined change to the lighting. Some embodiments may substitute a button press for the gesture of block 724.

Other embodiments may use various combinations of button presses, changes of the situation of the handheld controller, and predefined gestures to control lighting. Some examples of other embodiments may, without limitation, include:
- a quick button press to toggle the lighting between an off state and the previous brightness level
- a predefined gesture such as a vertical shake to switch between portions of the lighting to control
- using proximity to a luminaire to determine the portion of the lighting to control
- using different buttons to determine different portions of the lighting to control with a separate button provided to control the entire lighting system together
- predefined gestures to select particular colors of lighting, e.g. a quick sweep up to select white, a quick sweep to the left to select green, a quick sweep to the right to select red, and a quick sweep down to select blue
- using elevation of the handheld controller above the floor to indicate brightness
- using a double-press of a button or a shake of the handheld controller to set the brightness to full brightness Various embodiments may use any situation or sequence of situations to control any parameter of the lighting.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "handheld controller," "computer," "server," "circuit," "module," "network controller," "logic" or "system." Furthermore, aspects of the various embodiments may take the form of a computer program product embodied in one or more computer readable medium(s) having computer readable program code stored thereon.

Any combination of one or more computer readable storage medium(s) may be utilized. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage mediums described herein. In the context of this document, a computer readable storage medium may be any tangible medium that can contain, or store a program and/or data for use by or in connection with an instruction execution system, apparatus, or device.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements. The recitation of numerical ranges by endpoints includes all numbers subsumed within that range (e.g. 1 to 5 includes 1, 1.5, 2, 2.75, 3, 3.80, 6, and 5).

As used in this specification and the appended claims, the singular forms "a", "an", and "the" include plural referents unless the content clearly dictates otherwise. Thus, for example, reference to an element described as "an LED" may refer to a single LED, two LEDs or any other number of LEDs. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112(f).

The description of the various embodiments provided above is illustrative in nature and is not intended to limit the invention, its application, or uses. Thus, different variations beyond those described herein are intended to be within the scope of the embodiments of the present invention. Such variations are not to be regarded as a departure from the intended scope of the present invention. As such, the breadth and scope of the present invention should not be limited by the above-described exemplary embodiments, but should be defined only in accordance with the following claims and equivalents thereof.

What is claimed is:

1. A method of controlling lighting, the method comprising:
   retrieving readings from at least one magnetometer in a handheld controller;
   determining a situation of the handheld controller based at least in part on the readings from the at least one magnetometer;
   determining a change to the lighting based on the situation of the handheld controller; and
   sending a message to initiate the change to the lighting.

2. The method of claim 1, further comprising:
   detecting a first gesture of the handheld controller;
   adjusting a parameter of the lighting based on the situation of the handheld controller after the first gesture is detected;
   detecting a second gesture of the handheld controller; and
   halting the adjustment of the parameter in response to the second gesture.

3. The method of claim 1, further comprising:
   detecting a touch to a touchscreen on the handheld controller; and
   determining the change to the lighting based on both the touch and the situation of the handheld controller.

4. A computer program product for controlling lighting, the computer program product comprising:
   a non-transitory computer readable storage medium having computer readable program code embodied therewith, the computer readable program code comprising:
   computer readable program code to detect a situation of a handheld controller by retrieving readings from at least one magnetometer in the handheld controller;
   computer readable program code to determine a change for a parameter of the lighting based on the situation of the handheld controller; and
   computer readable program code to send a message to initiate the change for the parameter to the lighting.

5. The computer program product of claim 4, wherein the situation of the handheld controller comprises a position of the handheld controller.

6. The computer program product of claim 4, wherein the situation of the handheld controller comprises a movement of the handheld controller.

7. The computer program product of claim 4, further comprising:
   computer readable program code to detect a gesture of the handheld controller;
   computer readable program code to send the message in response to the gesture.

8. The computer program product of claim 4, further comprising:
   computer readable program code to detect a first gesture of the handheld controller;
   computer readable program code to adjust the parameter of the lighting based on the situation of the handheld controller after the first gesture is detected;
   computer readable program code to detect a second gesture of the handheld controller; and
   computer readable program code to halt the adjustment of the parameter in response to the second gesture.

9. The computer program product of claim 4, further comprising:
   computer readable program code to retrieve readings from at least one accelerometer in the handheld controller to detect the situation of the handheld controller.

10. The computer program product of claim 4, further comprising:

computer readable program code to retrieve readings from a three-axis magnetometer and a three-axis accelerometer in the handheld controller to detect the situation of the handheld controller.

11. The computer program product of claim 4, further comprising:
computer readable program code to determine a brightness of the lighting based on the situation of the handheld controller selected from the group consisting of yaw, pitch, and roll of the handheld controller.

12. The computer program product of claim 4, further comprising:
computer readable program code to determine a brightness of the lighting based on a pitch of the handheld controller;
computer readable program code to determine a color of the lighting based on a roll of the handheld controller; and
computer readable program code to determine a portion of the lighting to control based on a yaw of the handheld controller.

13. The computer program product of claim 4, further comprising:
computer readable program code to determine a portion of the lighting to control based on a proximity of the handheld controller to the portion of the lighting.

14. The computer program product of claim 4, further comprising:
computer readable program code to determine a portion of the lighting to control based on a gesture of the handheld controller.

15. A computer program product for controlling lighting, the computer program product comprising a non-transitory computer readable storage medium having computer readable program code embodied therewith, the computer readable program code comprising:
computer readable program code to detect a situation of a handheld controller;
computer readable program code to detect that a button of the handheld controller is being pressed;
computer readable program code to set a parameter of the lighting based on the button press and the situation of the handheld controller; and
computer readable program code to send a message to the lighting to set the parameter.

16. A computer program product for controlling lighting, the computer program product comprising a non-transitory computer readable storage medium having computer readable program code embodied therewith, the computer readable program code comprising:
computer readable program code to detect a situation of a handheld controller;
computer readable program code to detect a touch to a touchscreen on the handheld controller;
computer readable program code to set a parameter of the lighting based on the touch and the situation of the handheld controller; and
computer readable program code to send a message to the lighting to set the parameter.

17. A handheld controller for lighting comprising:
a non-transitory computer readable storage medium having computer readable program code embodied therewith;
a processor, coupled to the computer readable storage medium, to execute the computer readable program code;
situation detection circuitry coupled to the processor; and
a wireless network interface coupled to the processor to transmit a message to change to the lighting;
the computer readable program code comprising:
computer readable program code to detect a situation of the handheld controller;
computer readable program code to determine a change to the lighting based on the situation of the handheld controller; and
computer readable program code to send the message to initiate the change to the lighting.

18. The handheld controller of claim 17, the computer readable program code further comprising:
computer readable program code to detect a first gesture of the handheld controller;
computer readable program code to adjust a parameter of the lighting based on the situation of the handheld controller after the first gesture is detected;
computer readable program code to detect a second gesture of the handheld controller; and
computer readable program code to halt the adjustment of the parameter in response to the second gesture.

19. The handheld controller of claim 17, further comprising a magnetometer coupled to the processor, wherein the computer readable program code to detect the situation of the handheld controller retrieves readings from the magnetometer.

20. The handheld controller of claim 17, further comprising a touchscreen coupled to the processor;
the computer readable program code further comprising:
computer readable program code to detect a touch to the touchscreen;
computer readable program code to determine the change to the lighting based on both the touch and the situation of the handheld controller.

* * * * *